Figure 1:
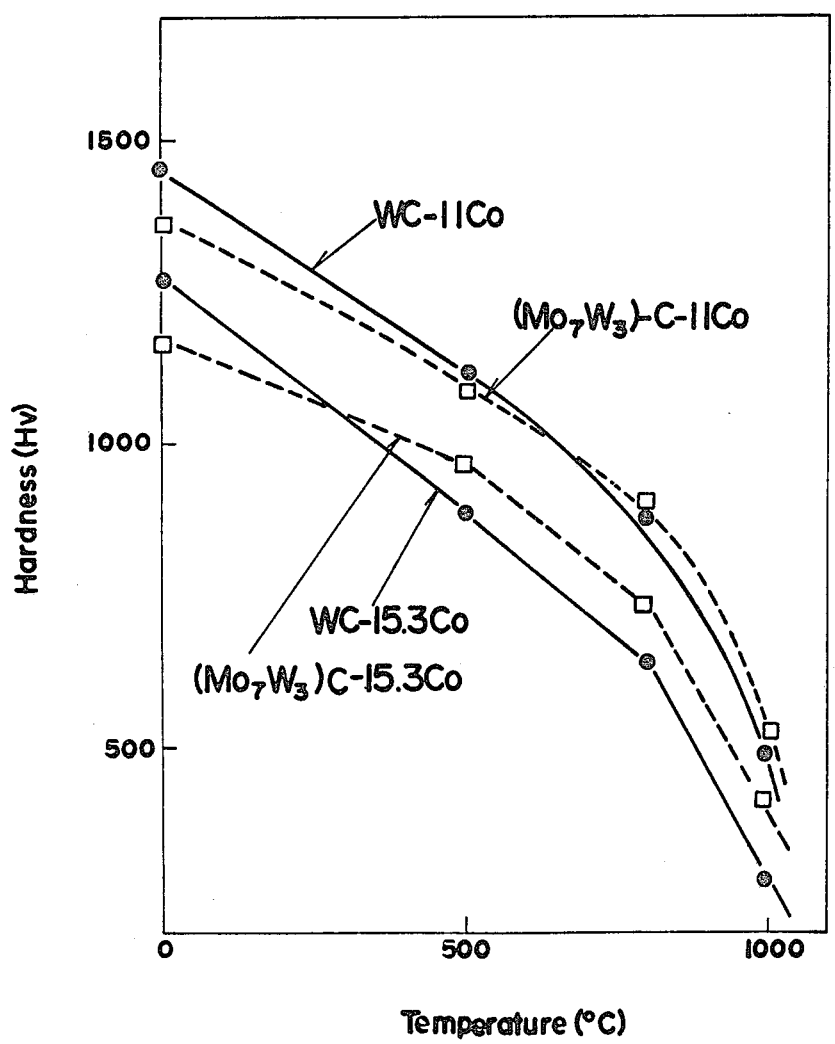

United States Patent [19]

Hara et al.

[11] 4,442,180
[45] Apr. 10, 1984

[54] SINTERED BODY FOR USE IN A CUTTING TOOL AND THE METHOD FOR PRODUCING THE SAME

[75] Inventors: Akio Hara; Shuji Yazu, both of Hyogo, Japan

[73] Assignee: Sumitomo Electric Industries, Ltd., Osaka, Japan

[21] Appl. No.: 262,027

[22] Filed: May 8, 1981

Related U.S. Application Data

[62] Division of Ser. No. 36,989, May 7, 1979, Pat. No. 4,293,618.

[30] Foreign Application Priority Data

May 14, 1978 [JP] Japan .................................. 53-58546

[51] Int. Cl.$^3$ .......................... C22C 29/00; B22F 7/06
[52] U.S. Cl. .................................... 428/551; 428/565; 75/240; 75/242; 75/244; 419/6; 51/307
[58] Field of Search ...................... 75/238, 244, 208 R, 75/242, 240, 237; 428/551, 565; 51/307, 309; 419/6

[56] References Cited

U.S. PATENT DOCUMENTS

| | | | |
|---|---|---|---|
| 3,743,489 | 7/1973 | Wentorf | 51/307 |
| 3,918,219 | 11/1975 | Wentorf | 51/307 |
| 3,982,911 | 9/1976 | Lee | 51/307 |
| 4,049,380 | 9/1977 | Yih | 75/203 |
| 4,063,909 | 12/1977 | Mitchell | 51/309 |
| 4,108,614 | 8/1978 | Mitchell | 51/309 |
| 4,110,084 | 8/1978 | Lee | 51/307 |
| 4,150,195 | 4/1979 | Tobioka | 428/565 |
| 4,219,339 | 8/1980 | Wilson | 51/309 |
| 4,225,322 | 9/1980 | Knemeyer | 51/309 |
| 4,228,942 | 10/1980 | Dietrich | 51/309 |

*Primary Examiner*—L. Dewayne Rutledge
*Assistant Examiner*—J. J. Zimmerman
*Attorney, Agent, or Firm*—Wenderoth, Lind & Ponack

[57] ABSTRACT

The invention relates to a sintered body for use in a cutting tool comprising a cutting edge forming part having particularly high hardness and wear resistance bonded to a supporting member having high plastic deformability, stiffness, transverse rupture strength, thermal conductivity, thermal expansion coefficient, resistance to corrosion, oxidization and the like, and to a method for producing the same. A diamond powder or high pressure form boron nitride powder is placed in contact with preliminarily sintered cermet constituted by carbide crystals chiefly comprising molibdenum in the form of (Mo, W)C bonded by iron group metals, the combined body being sintered at a temperature and pressure under which the diamond powder or high pressure form boron nitride powder is thermodynamically stable so that the sintered body of the diamond or high pressure form boron nitride is bonded to the cermet thereby enabling to obtain a sintered body having the said high properties for use in a cutting tool.

10 Claims, 4 Drawing Figures

SINTERED BODY FOR USE IN A CUTTING TOOL AND THE METHOD FOR PRODUCING THE SAME

This is a divisional of application Ser. No. 39,989, filed May 7, 1979, now U.S. Pat. No. 4,293,618.

The invention relates to a sintered body for use in a cutting tool and a method for producing the same.

Cutting tools in which a sintered body of diamond or cubic crystal type boron nitride (hereinafter referred to as CBN) among high pressure form boron nitrides is bonded to one face of WC-Co alloy to a thickness of about 0.5 mm are already commercially available.

In all these cutting tools, molten metals chiefly comprising Co fused from WC-Co infiltrate in between the particles of diamond or CBN during the sintering process, the fused metals bonding the sintered body to the ultrahard alloy whilst serving as a bonding material for the particles.

The technology is as disclosed in Japanese Laying-Open Gazette No. SHO-46-5204 and No. SHO-48-17503.

The inventors of the present application made a follow-up test on the examples disclosed in the aforesaid patents. As a result, it was found that it was practically difficult to use a WC-Co green compact as indicated in the examples. A first difficulty lay in the disposal of a large amount of gaseous components contained in WC-Co green compact which was a very fine powder, whilst a second difficulty lay in the fact that the pressed body did not have sufficient strength to be held in shape during the sintering process.

The inventors, therefore, directed their attention to a WC-Co sintered body. However, a further difficulty arose in the form of cracks though the aforementioned two difficulties had been solved. The inventors reached a conclusion that the cracks were caused by the fact that the deformability of WC-Co could not conform with the stress exceeding the strength of WC-Co, though that deformability is increased at high temperature, since it was usual that the temperature was raised after the pressure was raised to a required level particularly at the initial stage of the hot press treatment. This difficulty could be avoided by the use of WC-Co alloy which had high deformability up to breakage. Such alloy, however, had a large amount of Co and coarse particles of WC crystals. Moreover, such alloy, though it had high deformability, had low stiffness, its stiffness being decreased at high temperatures thereby reducing the significance of its use as a supporting member for the edge of a cutting tool.

Thus, the inventors directed their attention to an alloy comprising (Mo,W)C bonded by iron group metals, particularly Ni and Co, which had been developed by one of said inventors in collaboration with another researcher. They had been making a study of the method for producing (Mo, W)C, (Mo, W)C base cermet and the properties of said cermet.

The result of the examination showed that the cermet could cover most of the shortcomings of WC-Co. This finding is not a known fact since no similar data have ever been made public.

The invention will now be described in detail in reference to the accompanying drawings.

FIG. 1 explains the effect of the invention by a comparison of the high temperature Vickers hardness of (Mo, W)C base cermet for use in the invention and that of the conventional WC-Co alloy. The comparison is made in respect of each two kinds of alloys having 11 vol % and 15.3 vol % of the bonding phase metals.

Figure 2:
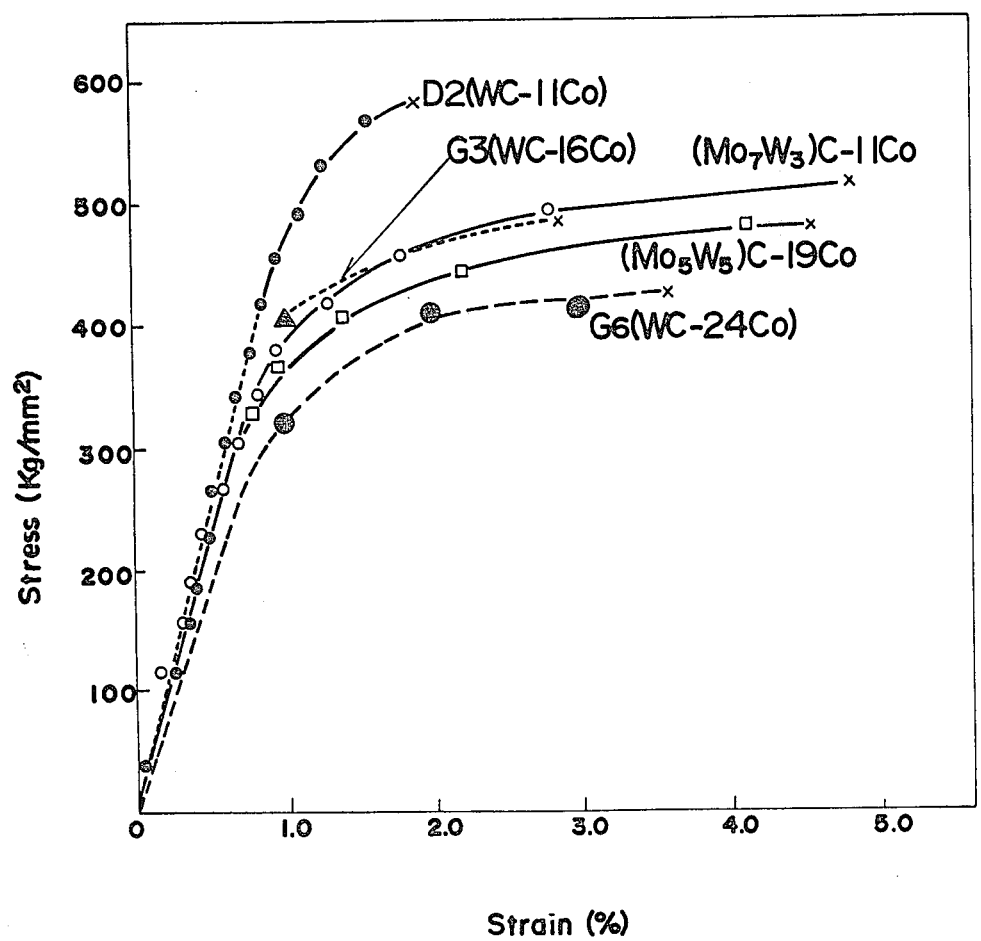

FIG. 2 shows a comparison between the stress-deformation curve under compression stress of (Mo, W)C base cermet for use in the invention and that of the conventional WC-Co alloy. The mark X indicated on the curve shows the point of compression breakage. The comparison between WC-11 vol % Co and (Mo$_7$, W$_3$)C-11 vol % Co both containing the same vol % of bonding metals shows that the latter has a particularly high plastic deformability. The symbols, D$_2$, G$_3$ and G$_6$, in the drawing designate the kinds of Igetaloy which is the registered trademarks of cemented carbides developed by the applicants. WC-11 Co shows WC-11 Vol % Co alloy.

Figure 3:
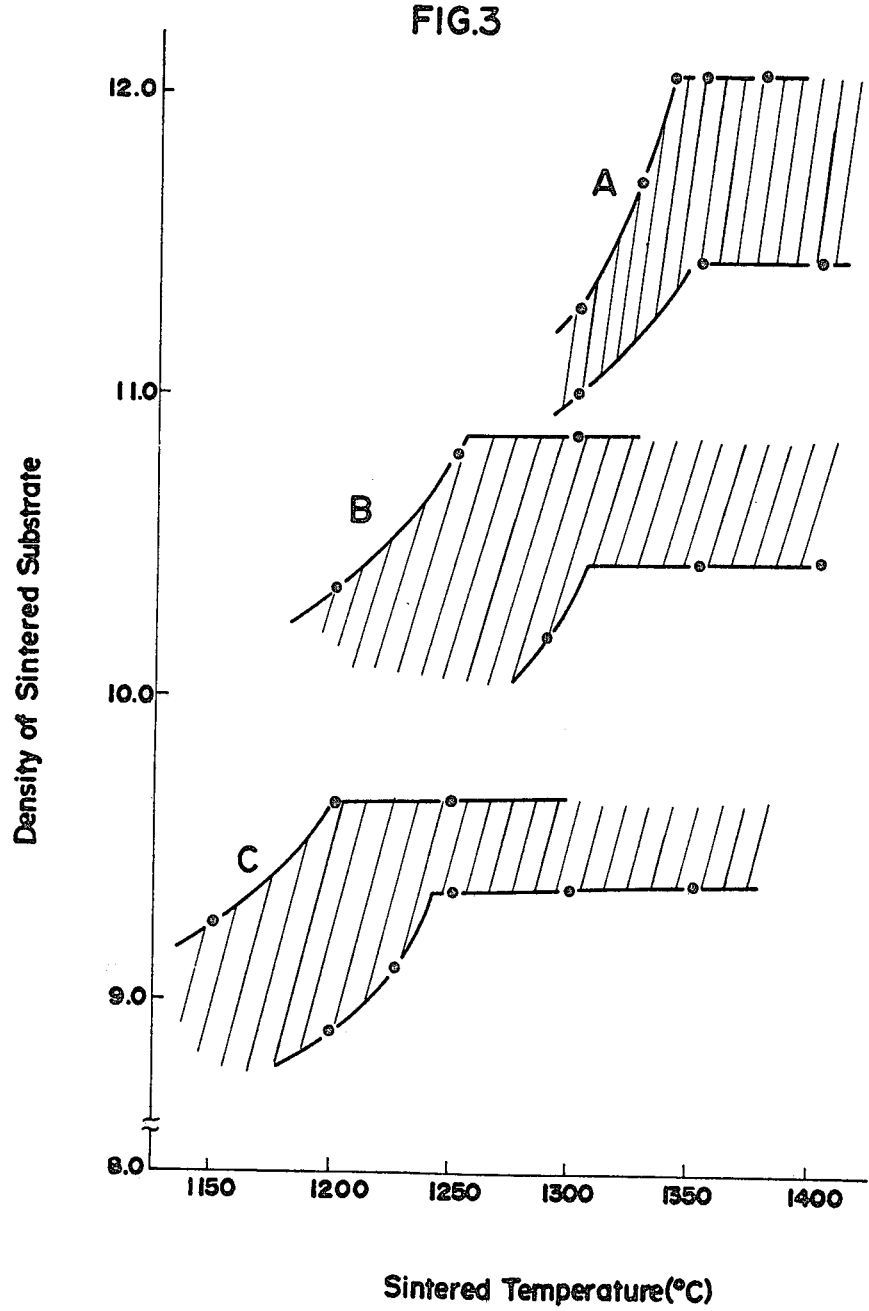

FIG. 3 also explains the effect of the invention wherein are shown the sintering temperature of (Mo, W)C base cermet and the specific gravity of the sintered body. In the drawing, (A) shows (Mo$_5$, W$_5$)C-10% Co-10% Ni alloy (wt % of cermet), (B) showing (Mo$_7$, W$_3$)C-10% Co-10% Ni alloy, (C) showing (Mo$_9$, W$_1$)C-10% Co-10% Ni alloy.

Figure 4:
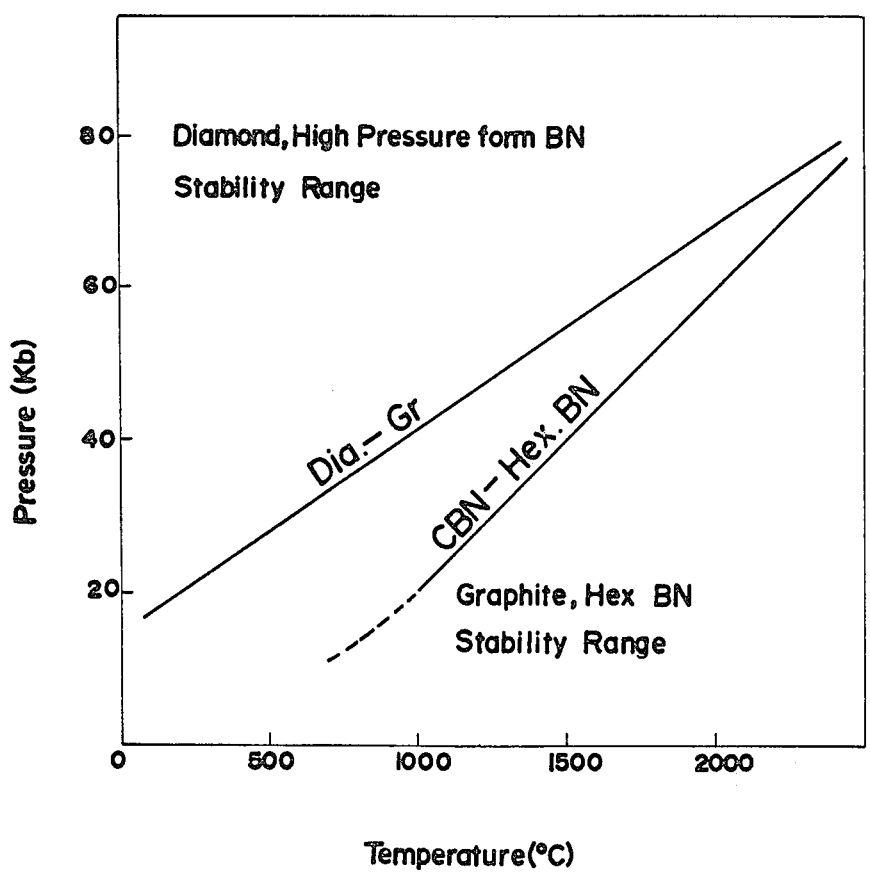

FIG. 4 explains the production condition of the sintered body according to the invention, wherein is shown the stability zone on the pressure temperature phase chart of diamond and high pressure boron nitride.

To be more precise, as shown in FIG. 1, (Mo, W)C base cermet has higher hardness at high temperatures than WC base cermet though softer at normal temperature. This is a particularly important property when cermet is for use in a cutting tool. As shown in FIG. 2, (Mo, W)C-Co has far higher deformability up to breakage compared with WC-Co. The properties of (Mo, W)C base cermet shown in FIG. 2 well conform with the aforementioned object of the invention, that is, an alloy having high plastic deformability and stiffness.

The invention is characterized by the combination of the properties required at the time of the ultrahigh pressure hot press treatment and the properties shown by the new alloy. With respect to the other properties, such as transverse rupture strength, thermal conductivity, thermal expansion coefficient, resistance to corrosion, oxidization and the like, no perceptible difference is found between WC-Co and (Mo, W)C-Co. One of the characteristics of the compound sintered body according to the invention consists in alleviation of the condition of temperature and pressure at the time of the ultrahigh pressure sintering process.

FIG. 3 shows the relation between the sintering temperature at the time of vacuum sintering of the (Mo, W)C base cermet for use in the compound sintered body according to the invention and the specific gravity of the sintered body thus obtained. In the drawing, (A) shows (Mo$_5$, W$_5$)C-10% Co-10% Ni (wt %) alloy, (B) showing (Mo$_7$, W$_3$)C-10% Co-10% Ni alloy, (C) showing (Mo$_9$, W$_1$) C-10% Co-10% Ni alloy. Each width illustrated by oblique lines shows that the sintering temperature and the specific gravity of the sintered body vary in accordance with the carbon content in each alloy. The curve below the oblique lines shows the case of a high carbon alloy corresponding to x=1 when the carbon content of the alloy is represented by the combined carbon amount of the carbide in the form of (Mo, W)$_1$ C$_x$, whilst the curve above the oblique lines shows the case of a low carbon alloy corresponding to x=0.6.

As is apparent from the drawing, according to the (Mo, W)C base cermet for use in the invention, the sintering temperature is reduced in conformity with an increase in the Mo content in the carbide. Within the scope of the experiment, the lower the carbon content, the lower is the temperature at which the sintering proceeds. It is to be noted that in the case of $(Mo_9, W_1)C$ base alloy shown at (C) in the drawing the sintering has been completed at 1200° C.

The liquid phase appearance temperature is about 1300° C. for the WC-Co alloy, and no perfect sintered body is obtainable unless it is sintered at a higher temperature. When a WC-Co alloy is used as a supporting member for the diamond sintered body, the temperature should be raised to 1300° C. or higher at the time of an ultrahigh pressure sintering process. According to the invention, however, the liquid phase appearance temperature is reduced to about 1200° C. when (Mo, W)C base alloy having a high Mo content among (Mo, W)C base alloys is used, whereby the temperature required for the ultrahigh pressure sintering is also reduced. The fact that the temperature required for the sintering can be reduced is particularly important from the industrial viewpoint.

FIG. 4 shows the stability zone on the pressure temperature phase chart of the diamond or high pressure forms boron nitride according to the invention. When the sintered body according to the invention is produced, the production should be effected under the sintering condition within the stability zone. If the temperature necessitated for the sintering is lowered, the required pressure can be synchronously reduced accordingly. This makes it possible to extend the life of the ultrahigh pressure high temperature apparatus for use in the invention.

The carbon content of the (Mo, W)C base cermet for use in the invention is preferably controlled within such scope as will enable to obtain sufficient strength properties. It has been found as a result of experiments that, when the carbon content of the cermet is represented by the combined carbon amount of a carbide in the form of $(MO, W)_1 C_x$, high strength property is obtainable when x is within the range of 0.8–0.98.

The invention has a further advantage in that (Mo, W)C is cheaper nearly by half than WC. This is a particularly important advantage in view of the fact that the cost of W has made a steep rise in recent years.

The present invention has been made as a result of pursuit of the properties of the supporting member of the sintered body. The relation between the sintered body and the supporting member has no bearing upon the invention insofar as it exerts no influence on the properties described hereinbefore. To be more precise, the sintered body and the supporting member may be bonded directly with each other, or a different material may be interposed therebetween. However, if the intermediate material is too thick, it will function as one of the supporting members. It is preferable, therefore, that the intermediate material has a thickness less than 0.1 mm.

The sintered body obtainable according to the invention is for use in a cutting tool, the sintered body comprising a diamond or high pressure form boron nitride sintered body rigidly bonded to (Mo, W)C base cermet supporting member having high stiffness. The compound sintered body is for use in a cutting tool as it stands or by being welded to a steel bite shank.

The following are the examples according to the invention.

EXAMPLE 1

A sintered body 10 mm in diameter and 2 mm in thickness made of an alloy of $(Mo_7, W_3)C$-11 vol % Co was produced. A pressed body 0.5 mm in thickness of a diamond powder 3μ in granularity was placed on said sintered body. The compound sample was processed by means of an ultrahigh pressure high temperature apparatus for use in synthesizing diamonds. After the pressure was raised to 55 Kb, the apparatus was electrified to raise the temperature to 1400° C., said temperature being sustained for 10 minutes. When taken out after the fall of the temperature and pressure, the sample was found to have a beautiful appearance with high dimensional precision. A Co alloy containing Mo, W and C, the liquid phase components at 1400° C., was found to have infiltrated from the (Mo, W)C-Co alloy into the diamond part as bonding material, whilst said diamond part was bonded to the (Mo, W)C-Co alloy.

The same experiment was conducted on WC-11 vol % Co alloy (7 wt % Co) corresponding to $(Mo_7, W_3)$C-11 vol % Co alloy. The compound sintered body thus obtained had several cracks thereon and was not suitable for practical use.

EXAMPLE 2

A sintered body 10 mm in diameter and 2 mm in thickness was made of $(Mo_7, W_3)$C-7 vol % Co-4 vol % Ni alloy. The sintered body was placed in a tubular vessel made of Ta, a Mo disk 10 mm in diameter and 0.05 mm in thickness being placed thereon, the vessel being filled with a diamond powder 3μ in granularity to a thickness of about 1.5 mm. An iron plate 10 mm in outside diameter and 3 mm in thickness was placed in contact with the top of the diamond powder, a Mo disk 10 mm in diameter and 0.05 mm in thickness being placed thereon, a sintered body of the same (Mo, W)C-Co cermet as in the aforesaid example being superposed thereon.

The compound sample thus prepared was processed by means of the same ultrahigh pressure high temperature apparatus as in Example 1. After the pressure was raised to 55 Kb, the temperature was raised to and sustained at 1450° C. for 10 minutes. After the fall of the temperature and pressure, the sample was taken out of the apparatus. The Ta vessel was scraped away and the upper (Mo, W)C base cermet was removed to obtain a diamond sintered body about 10 mm in outside diameter and about 1 mm in thickness rigidly bonded to the lower (Mo, W)C base cermet. An X-ray analysis of the diamond sintered body showed diamond and α-Fe, $Fe_3C$ diffraction peaks. The bonded phase of the diamond sintered body was formed as a result the infiltration of iron placed in contact with the diamond powder layer in the course of the sintering process. The Mo plate placed on the interface between the diamond sintered body and the (Mo, W)C base cermet was formed into $Mo_2C$, the diamond sintered body being rigidly bonded to the lower cermet with interposition thereof.

The same compound sample was produced by making use of the same materials except that (Mo, W)C base cermet was replaced by WC-11 vol % Co alloy having the same vol % of metal bonding material and sintered under the same condition. The sintered body thus obtained had several cracks running in the direction of thickness on both the upper and lower WC-Co alloys.

The cracks were found to have reached the diamond sintered body.

When ultrahigh pressure is applied, the diamond powder is compacted. However, the stress applied to the upper and lower sintered alloy disks is not uniform in the direction of radius. As a result, cracks were produced in WC-11 vol % Co alloy having small plastic deformability. The same sintering experiment was repeated, and a compound sintered body completely free from cracks was obtained every time when (Mo, W)C base cermet according to the invention was used.

EXAMPLE 3

The same sintered body as in Example 2 was produced by making use of $(Mo_5, W_5)C$-15.3 vol % Co alloy. On the disk of said sintered body was placed a Mo disk about 10 mm in diameter and 0.05 mm in thickness, a pressed body 10 mm in diameter and 1.5 mm in thickness made of a mixture comprising 60 vol % of CBN $3\mu$ in granularity and 40 vol % of TiN $1\mu$ in granularity being superposed thereon. The compound sample thus prepared was sintered at 55 Kb and 1400° C. by means of the ultrahigh pressure apparatus. The sintered body thus obtained was completely free from cracks with a sintered body about 1.2 mm in thickness comprising CBN and TiN rigidly bonded to (Mo, W)C-Co alloy.

EXAMPLE 4

A compound sample same as that in Example 3 was produced by making use of wurtzite form BN powder less than $1\mu$ in granularity. The sintering process was effected under a pressure of 55 Kb and by sustaining the temperature at 1300° C. for 10 minutes. The compound sintered body thus obtained was completely free from cracks with a sintered body exclusively comprising wurtzite form BN rigidly bonded to (Mo, W)C base cermet.

EXAMPLE 5

Cermet having a composition of $(Mo_9, W_1)C$-7 vol % Co-4 vol % Ni-0.5 vol % Fe was produced by adding Co, Ni and a small amount of Fe powder to a carbide having a composition of $(Mo_9, W_1)C_{0.9}$. The cermet having a diameter of 10 mm and a thickness of 2 mm was sintered in a vacuum at a temperature of 1250° C. sustained for 30 minutes. A pressed body 0.7 mm in thickness of diamond powder $3\mu$ in granularity was placed on the cermet.

The sample thus prepared was sintered by means of the same ultrahigh pressure high temperature apparatus as in Example 1 under a pressure of 48 Kb and at a temperature of 1200° C. sustained for 10 minutes. The sintered body thus obtained had a layer 0.5 mm in thickness of a diamond sintered body rigidly bonded to the disk of (Mo, W)C base cermet.

As a result of an examination by means of an X-ray microanalyzer, it was ascertained that Co, Ni and Mo existed as a bonding phase of the diamond particles. W was scarcely detected.

EXAMPLE 6

Seven sintered bodies each 10 mm in diameter and 2 mm in thickness were produced by making use of cermet having the composition of $(Mo_9, W_1)C$-7 vol % Co-4 vol % Ni-0.5 vol % Fe as in Example 5.

CBN powder and TiN powder as used in Example 3 were mixed so that the mixture comprises 90 vol % CBN and 10 vol % TiN. The mixture was milled by a ball mill.

A sample was prepared by placing one of the cermet disks in a Mo-made vessel 14 mm in outside diameter and 10 mm in inside diameter, Mo foil $50\mu$ in thickness being superposed thereon, the upper space of the vessel being filled with the aforesaid powder mixture.

The other samples were prepared in the same construction except that the Mo foil was replaced by foils $50\mu$ in thickness of W, Nb, Ta, Ti, Zr and Hf, respectively.

The seven compound samples thus prepared were sintered by means of the same ultrahigh pressure high temperature apparatus as in Example 1 under a pressure of 40 Kb and at a temperature of 1200° C. sustained for 10 minutes.

Each of the sintered bodies thus obtained had a layer about 1 mm in thickness of a hard sintered body comprising CBN and TiN rigidly bonded to (Mo, W)C base cermet.

As a result of examination of the bonded interface of the sintered body, it was found that, in case of the sintered body in which Mo foil was used, an intermediate bonding layer about $50\mu$ in thickness of $Mo_2C$ and MoC was produced as a result of diffusion of carbon from the (Mo, W)C base cermet during the ultrahigh pressure sintering process.

In case of the use of W foil, WC was produced, whilst in case of Nb, Ta, Ti, Zr and Hf, the CBN sintered body was bonded to the (Mo, W)C base cermet with interposition of an intermediate bonding layer about $50\mu$ in thickness of NbC, TaC, TiC, ZrC, HfC, respectively.

What is claimed is:

1. In a diamond sintered body or high pressure form boron nitride sintered body for use in a cutting tool, the improvement wherein said sintered body is supported by cermet in which carbide crystals in the form of $(Mo, W)_1 C_x$ wherein x is within the range of 0.8 to 0.98, chiefly consisting of molybdenum are bonded by iron group metals with the interposition of an intermediate bonding layer consisting of a metal carbide less than 0.1 mm in thickness.

2. The improvement according to claim 1 in which the sintered body is a diamond sintered body.

3. The improvement according to claim 1 in which the sintered body is a high pressure form boron nitride sintered body.

4. The improvement according to claims 1, 2 or 3 in which the iron group metals used to bond the carbide crystals are selected from the group consisting of Ni, Co and mixtures thereof.

5. The improvement according to claim 1 in which the metal carbide is a carbide of a metal selected from the group consisting of Mo, Nb, Ta, Ti, Zr and Hf.

6. A method for producing a diamond or high pressure form boron nitride sintered body for use in a cutting tool characterized in that a metal foil less than 1 mm in thickness selected from Mo, W, Nb, Ta, Ti, Zr and Hf is placed in contact with preliminarily sintered cermet in which carbide crystals in the form of $(Mo, W)_1 C_x$, wherein x is within the range of 0.8 to 0.98, chiefly consisting of molybdenum are bonded by iron group metals, diamond powder or high pressure form boron nitride powder being effected at a temperature of at least 1200° C. and under pressure conditions as defined in FIG. 4 in which the diamond or high pressure form boron nitride is thermodynamically stable, said metal foil being transformed into a carbide by the diffusion of carbon from the supporting cermet in the course of the sintering process, thereby bonding the diamond or high pressure form boron nitride sintered body to the cermet with the interposition of said carbide layer.

7. The method according to claim 6 in which the sintered body is a diamond sintered body.

8. The method according to claim 6 in which the sintered body is a high pressure form boron nitride sintered body.

9. The method according to claim 6 in which the iron group bonding metal is selected from the group consisting of Ni, Co and mixtures thereof.

10. The method according to claim 6 in which the sintering pressure is at least 40 kb.

* * * * *